United States Patent
Yang et al.

(10) Patent No.: US 9,269,934 B2
(45) Date of Patent: *Feb. 23, 2016

(54) BATTERY MODULE

(75) Inventors: Heekook Yang, Daejeon (KR); Jae Hun Yang, Daejeon (KR); Jin Kyu Lee, Busan (KR)

(73) Assignee: LG Chem, Ltd. (KR)

( * ) Notice: Subject to any disclaimer, the term of this patent is extended or adjusted under 35 U.S.C. 154(b) by 279 days.

This patent is subject to a terminal disclaimer.

(21) Appl. No.: 12/224,689

(22) PCT Filed: Feb. 28, 2007

(86) PCT No.: PCT/KR2007/001022
§ 371 (c)(1),
(2), (4) Date: May 14, 2009

(87) PCT Pub. No.: WO2007/102672
PCT Pub. Date: Sep. 13, 2007

(65) Prior Publication Data
US 2009/0220853 A1 Sep. 3, 2009

(30) Foreign Application Priority Data

Mar. 6, 2006 (KR) .................. 10-2006-0020772
May 22, 2006 (KR) .................. 10-2006-0045444

(51) Int. Cl.
*H01M 6/42* (2006.01)
*H01M 2/24* (2006.01)
(Continued)

(52) U.S. Cl.
CPC .......... *H01M 2/1077* (2013.01); *H01M 2/0277* (2013.01); *H01M 2/1061* (2013.01);
(Continued)

(58) Field of Classification Search
USPC ......................................... 429/159, 158, 153
See application file for complete search history.

(56) References Cited

U.S. PATENT DOCUMENTS 4,278,744 A 7/1981 Athearn
4,957,829 A 9/1990 Holl
(Continued)

FOREIGN PATENT DOCUMENTS

EP 957526 A1 11/1999
JP 61-171065 A 8/1986
(Continued)

OTHER PUBLICATIONS

Office Action from Korean Patent Application No. 10-2006-0020772 dated Feb. 4, 2010.
(Continued)

*Primary Examiner* — Ula C Ruddock
*Assistant Examiner* — Matthew Van Oudenaren
(74) *Attorney, Agent, or Firm* — Lerner, David, Littenberg, Krumholz & Mentlik, LLP (57) ABSTRACT

Disclosed herein is a battery module including two or more plate-shaped battery cells, as unit cells, constructed in a stacked structure in which electrode terminals of the battery cells are connected in series with each other and the electrode terminal connections are bent such that the battery cells are stacked, and a pair of high-strength cell covers for surrounding the outer surfaces of the battery cells when the cell covers are coupled with each other. The present invention has the effect of easily mounting a sensing unit that is capable of minimizing the weight and size of battery cells while effectively reinforcing the low mechanical strength of the battery cells and sensing the operation state of the battery cells to a battery module. In addition, the present invention has the effect of manufacturing the battery module by a simple assembly process without using a plurality of members for mechanical coupling and electrical connection, thereby decreasing the manufacturing costs of the battery module, and effectively preventing the battery module from being short-circuited or damaged during the manufacture or the operation of the battery module. Furthermore, the present invention has the effect of manufacturing a middle- or large-sized battery system having desired output and capacity using the battery module as a unit body.

22 Claims, 8 Drawing Sheets (51) Int. Cl.
  *H01M 2/10* (2006.01)
  *H01M 2/20* (2006.01)
  *H01M 10/42* (2006.01)
  *H01M 10/48* (2006.01)
  *H01M 2/02* (2006.01)

(52) U.S. Cl.
  CPC ............ *H01M2/206* (2013.01); *H01M 10/425* (2013.01); *H01M 10/486* (2013.01); *H01M 2/0275* (2013.01); *H01M 2/0287* (2013.01); *H01M 2/10* (2013.01)

(56) References Cited

U.S. PATENT DOCUMENTS

| | | |
|---|---|---|
| 5,366,827 A | 11/1994 | Belanger et al. |
| 5,437,939 A | 8/1995 | Beckley |
| 5,510,203 A | 4/1996 | Hamada et al. |
| 5,558,950 A | 9/1996 | Ovshinsky et al. |
| 5,639,571 A | 6/1997 | Waters et al. |
| 5,981,101 A | 11/1999 | Stone |
| 6,191,591 B1 | 2/2001 | Ratajczak et al. |
| 6,225,778 B1 | 5/2001 | Hayama et al. |
| 6,304,057 B1 | 10/2001 | Hamada et al. |
| 6,379,837 B1 | 4/2002 | Takahashi et al. |
| 6,410,184 B1 | 6/2002 | Horiuchi et al. |
| 6,482,544 B1 | 11/2002 | Shiota et al. |
| 6,569,561 B1* | 5/2003 | Kimura et al. ................. 429/159 |
| 6,773,848 B1 | 8/2004 | Nortoft et al. |
| 6,818,343 B1 | 11/2004 | Kimoto et al. |
| 6,896,995 B2 | 5/2005 | Saito |
| 7,597,996 B2 | 10/2009 | Ro et al. |
| 7,648,538 B2 | 1/2010 | Oogami et al. |
| 7,892,669 B2 | 2/2011 | Yang et al. |
| 8,329,324 B2 | 12/2012 | Lee et al. |
| 2002/0009649 A1* | 1/2002 | Sato et al. .................... 429/306 |
| 2002/0150815 A1 | 10/2002 | Ehara |
| 2002/0182480 A1 | 12/2002 | Hanauer et al. |
| 2003/0048090 A1 | 3/2003 | Sato et al. |
| 2003/0215702 A1 | 11/2003 | Tanjou et al. |
| 2004/0021442 A1 | 2/2004 | Higashino |
| 2004/0033415 A1 | 2/2004 | Chen et al. |
| 2004/0036444 A1* | 2/2004 | Oogami ........................ 320/110 |
| 2004/0050414 A1 | 3/2004 | Oogami |
| 2004/0055922 A1* | 3/2004 | Ordonez .................... 206/524.5 |
| 2004/0119442 A1* | 6/2004 | Lee et al. ..................... 320/112 |
| 2004/0253512 A1 | 12/2004 | Watanabe et al. |
| 2005/0031946 A1 | 2/2005 | Kruger et al. |
| 2005/0069763 A1 | 3/2005 | Hong et al. |
| 2005/0089751 A1 | 4/2005 | Oogami et al. |
| 2005/0100783 A1 | 5/2005 | Ro et al. |
| 2005/0110460 A1 | 5/2005 | Arai et al. |
| 2005/0215296 A1* | 9/2005 | Fujihara et al. ............ 455/575.3 |
| 2006/0040173 A1 | 2/2006 | Shimamura et al. |
| 2006/0093899 A1 | 5/2006 | Jeon et al. |
| 2006/0176014 A1* | 8/2006 | Moon .......................... 320/112 |
| 2006/0177734 A1 | 8/2006 | Yao |
| 2006/0183017 A1* | 8/2006 | Kanai .......................... 429/120 |
| 2007/0134551 A1 | 6/2007 | Cyr et al. |

FOREIGN PATENT DOCUMENTS

| | | | |
|---|---|---|---|
| JP | 10-129276 A | | 5/1998 |
| JP | 2002-313398 A | | 10/2002 |
| JP | 2003-68259 A | | 3/2003 |
| JP | 2003-123721 A | | 4/2003 |
| JP | 2005108693 | * | 2/2005 |
| JP | 2005-108693 | | 4/2005 |
| JP | 2005108693 | * | 4/2005 |
| JP | 2005-122927 A | | 5/2005 |
| JP | 2005-197179 A | | 7/2005 |
| JP | 2005-209365 A2 | | 8/2005 |
| JP | 2005-222701 A | | 8/2005 |
| JP | 2005-293907 A | | 10/2005 |
| JP | 2005-302501 A | | 10/2005 |
| JP | 2006-66322 | | 3/2006 |
| JP | 3891860 B2 | | 3/2007 |
| KR | 20060047061 A | | 5/2006 |
| TW | 2004-14583 | | 8/2001 |
| TW | 543217 B | | 7/2003 |
| TW | 2006-03456 | | 1/2006 |
| WO | 03/019703 A1 | | 3/2003 |
| WO | 2004/049470 A2 | | 6/2004 |
| WO | WO-2005/074054 A1 | | 8/2005 |
| WO | 2006/030659 A1 | | 3/2006 |
| WO | 2006/059434 A1 | | 6/2006 |
| WO | 2007079449 A2 | | 7/2007 |
| WO | 2007091757 A1 | | 8/2007 |

OTHER PUBLICATIONS

U.S. Appl. No. 12/224,687, Published Feb. 28, 2007.
U.S. Appl. No. 12/224,688, Published Dec. 10, 2009.
U.S. Appl. No. 12/224,526, Published Aug. 27, 2009.

* cited by examiner

BATTERY MODULE

CROSS REFERENCE TO RELATED APPLICATIONS

The present application is a national phase entry under 35 U.S.C. §371 of International Application No. PCT/KR2007/001022, filed Feb. 28, 2007, published in English, which claims priority from Korean Patent Application Nos. 10-2006-0020772, filed Mar. 6, 2006 and 10-2006-0045444, filed May 22, 2006. The disclosures of said applications are incorporated by reference herein.

FIELD OF THE INVENTION

The present invention relates to a battery module including plate-shaped battery cells having electrode terminals formed at the upper and lower ends thereof, and, more particularly, to a battery module including two or more battery cells constructed in a stacked structure in which electrode terminals of the battery cells are connected in series with each other and the electrode terminal connections are bent such that the battery cells are stacked, and a pair of high-strength cell covers for surrounding the outer surfaces of the battery cells excluding the electrode terminals of the battery cells when the cell covers are coupled with each other.

BACKGROUND OF THE INVENTION

Recently, a secondary battery, which can be charged and discharged, has been widely used as an energy source for wireless mobile devices. Also, the secondary battery has attracted considerable attention as an energy source for electric vehicles (EV) and hybrid electric vehicles (HEV), which have been developed to solve problems, such as air pollution, caused by existing gasoline and diesel vehicles using fossil fuel.

Small-sized mobile devices use one or several small-sized battery cells for each device. On the other hand, middle- or large-sized devices, such as vehicles, use a middle- or large-sized battery module having a plurality of battery cells electrically connected with each other because high output and large capacity are necessary for the middle- or large-sized devices.

Preferably, the middle- or large-sized battery module is manufactured with small size and small weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small and the manufacturing costs of the pouch-shaped battery are low.

Figure 1:
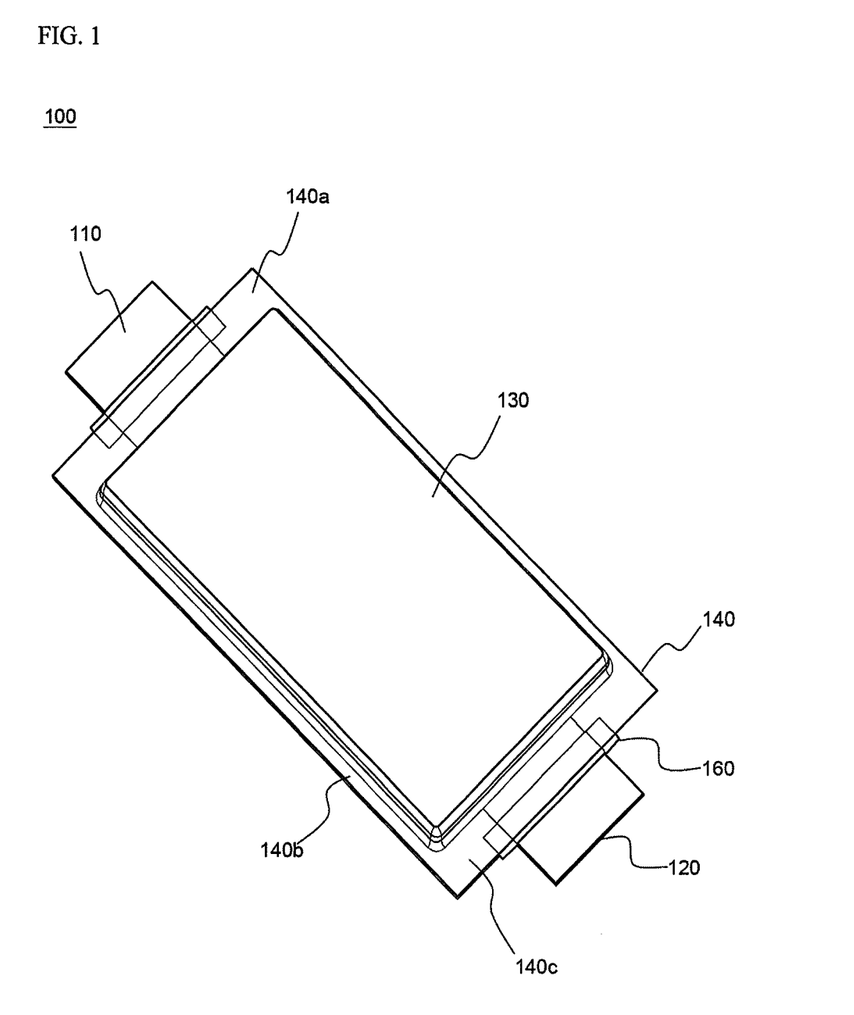
FIG. 1 is a perspective view illustrating a conventional representative pouch-shaped battery.

FIG. 1 is a perspective view typically illustrating a conventional representative pouch-shaped battery. The pouch-shaped battery 100 shown in FIG. 1 is constructed in a structure in which two electrode leads 110 and 120 protrude from the upper and lower ends of a battery body 130, respectively, while the electrode leads 110 and 120 are opposite to each other. A sheathing member 140 comprises upper and lower sheathing parts. That is, the sheathing member 140 is a two-unit member. An electrode assembly (not shown) is received in a receiving part which is defined between the upper and lower sheathing parts of the sheathing member 140. The opposite sides 140a and the upper and lower ends 140b and 140c, which are contact regions of the upper and lower sheathing parts of the sheathing member 140, are bonded to each other, whereby the pouch-shaped battery 100 is manufactured. The sheathing member 140 is constructed in a laminate structure of a resin layer/a metal film layer/a resin layer. Consequently, it is possible to bond the opposite sides 140a and the upper and lower ends 140b and 140c of the upper and lower sheathing parts of the sheathing member 140, which are in contact with each other, to each other by applying heat and pressure to the opposite sides 140a and the upper and lower ends 140b and 140c of the upper and lower sheathing parts of the sheathing member 140 so as to weld the resin layers thereof to each other. According to circumstances, the opposite sides 140a and the upper and lower ends 140b and 140c of the upper and lower sheathing parts of the sheathing member 140 may be bonded to each other using a bonding agent. For the opposite sides 140a of the sheathing member 140, the same resin layers of the upper and lower sheathing parts of the sheathing member 140 are in direct contact with each other, whereby uniform sealing at the opposite sides 140a of the sheathing member 140 is accomplished by welding. For the upper and lower ends 140b and 140c of the sheathing member 140, on the other hand, the electrode leads 110 and 120 protrude from the upper and lower ends 140b and 140c of the sheathing member 140, respectively. For this reason, the upper and lower ends 140b and 140c of the upper and lower sheathing parts of the sheathing member 140 are thermally welded to each other, while a film-shaped sealing member 160 is interposed between the electrode leads 110 and 120 and the sheathing member 140, in consideration of the thickness of the electrode leads 110 and 120 and the difference in material between the electrode leads 110 and 120 and the sheathing member 140, so as to increase sealability of the sheathing member 140.

However, the mechanical strength of the sheathing member 140 is low. In order to solve this problem, there has been proposed a method of mounting battery cells (unit cells) in a pack case, such as a cartridge, so as to manufacture a battery module having a stable structure. However, a device or a vehicle, in which a middle- or large-sized battery module is installed, has a limited installation space. Consequently, when the size of the battery module is increased due to the use of the pack case, such as the cartridge, the spatial utilization is lowered. Also, due to the low mechanical strength, the battery cells repeatedly expand and contract during the charge and the discharge of the battery cells. As a result, the thermally welded regions of the sheathing member may be easily separated from each other.

There have been proposed some technologies for covering the outer surfaces of the pouch-shaped battery cells using a cell cover so as to secure the safety of the battery cells.

For example, Japanese Patent Application Publication No. 2005-108693 discloses a cell cover including a pair of elastic parts, having the same elasticity, for supporting opposite major surfaces of a plate-shaped laminate battery cell.

The disclosure proposes a structure to elastically press the opposite major surfaces of the battery cell using the cell cover which is bent in a concave shape. However, the overall size of the battery cell is inevitably increased due to the additional attachment of the cell cover to the outer surface of the battery cell. Also, it is required that the battery cell be inserted into the cell cover with the above-stated construction. As a result, the assembly process is not easily performed, and therefore, mass production is difficult. That is, when the battery cell is forcibly inserted into the cell cover, excessive load is applied to the battery cell with the result that the battery cell may be damaged.

Meanwhile, since a battery module is a structural body including a plurality of battery cells which are combined with each other, the safety and the operating efficiency of the battery module are lowered when overvoltage, overcurrent, and overheat occurs in some of the battery cells. Consequently, a sensing unit for sensing the overvoltage, overcurrent, and overheat are needed. Specifically, voltage and temperature sensors are connected to the battery cells so as to sense and control the operation of the battery cells in real time or at predetermined time intervals. However, the attachment or the connection of the sensing unit complicates the assembly process of the battery module. In addition, short circuits may occur due to the provision of a plurality of wires necessary for the attachment or the connection of the sensing unit.

In addition, when a middle- or large-sized battery module is constructed using a plurality of battery cells or a plurality of unit modules each of which includes a predetermined number of battery cells, a plurality of members for mechanical coupling and electrical connection between the battery cells or the unit modules are needed, and a process for assembling the mechanical coupling and electrical connection members is very complicated. Furthermore, there is needed a space for coupling, welding, or soldering the mechanical coupling and electrical connection members with the result that the total size of the system is increased. The increase in size of the system is not preferred in the above-described aspect Consequently, there is high necessity for a battery module that is compact and structurally stable.

SUMMARY OF THE INVENTION

Therefore, the present invention has been made to solve the above problems, and other technical problems that have yet to be resolved.

Specifically, it is an object of the present invention to provide a cell cover that minimizes the weight and size of battery cells while effectively reinforcing the low mechanical strength of the battery cells and that is easily coupled to a battery module without using an additional coupling member.

It is another object of the present invention to provide a battery module that is manufactured by a simple assembly process without using a plurality of members for mechanical coupling and electrical connection, whereby the manufacturing costs of the battery module are lowered, and that is effectively prevented from being short-circuited or damaged during the manufacture or the operation of the battery module.

It is a further object of the present invention to provide a middle- or large-sized battery system that is manufactured using the battery module as a unit body such that the middle- or large-sized battery system has desired output and capacity.

In accordance with one aspect of the present invention, the above and other objects can be accomplished by the provision of a battery module including plate-shaped battery cells having electrode terminals formed at the upper and lower ends thereof, wherein the battery module comprises: two or more battery cells constructed in a stacked structure in which electrode terminals of the battery cells are connected in series with each other and the electrode terminal connections are bent such that the battery cells are stacked; and a pair of high-strength cell covers for surrounding the outer surfaces of the battery cells excluding the electrode terminals of the battery cells when the cell covers are coupled with each other.

In the battery module according to the present invention, the high-strength cell covers restrain the repetitive expansion and contraction change of the battery cells during the charge and discharge of the battery cells while protecting the battery cells having low mechanical strength, thereby preventing separation between sealing regions of the battery cells.

In a preferred embodiment, the cell covers have an inside structure corresponding to the outer shape of the battery cell stack, and the cell covers are coupled with each other in an assembly coupling fashion without using an additional coupling member. For example, the cell covers may have coupling parts constructed in a symmetrically bent structure formed approximately symmetrically in vertical section thereof such that the cell covers can be engaged with each other by elastic coupling when the cell covers are pressed while the cell covers are in contact with each other such that the cell covers face each other.

The plate-shaped battery cells are secondary batteries having a small thickness and a relatively large width and length, such that the total size of the secondary batteries is minimized when the secondary batteries are stacked to construct a battery module. In a preferred embodiment, each plate-shaped battery cell is a secondary battery constructed in a structure in which an electrode assembly is mounted in a battery case made of a laminate sheet including a resin layer and a metal layer, and electrode terminals protrude from upper and lower ends of the battery case. Specifically, each battery cell is constructed in a structure in which the electrode assembly is mounted in a pouch-shaped battery case made of an aluminum laminate sheet. Hereinafter, the secondary battery with the above-stated construction will be referred to as a pouch-shaped battery cell.

The case of the pouch-shaped battery cell may be constructed in various structures. For example, the sheathing member of the pouch-shaped battery may be constructed in a structure in which the electrode assembly is received in a receiving part formed at the upper inner surface and/or the lower inner surface of a two-unit member, and the upper and lower contact regions are sealed. A pouch-shaped battery cell with the above-described construction is disclosed in PCT International Application No. PCT/KR2004/003312, which has been filed in the name of the applicant of the present patent application. The disclosure of the above-mentioned patent application is hereby incorporated by reference as if fully set forth herein.

The electrode assembly comprises cathodes and anodes, by which the charge and the discharge of the battery are possible. The electrode assembly may be constructed in a structure in which the cathodes and the anodes are stacked while separators are disposed respectively between the cathodes and the anodes. For example, the electrode assembly may be constructed in a jelly-roll type structure or a stacking type structure. The cathodes and the anodes of the electrode assembly may be constructed such that electrode taps of the cathodes and electrode taps of the anodes directly protrude outward from the battery. Alternatively, the cathodes and the anodes of the electrode assembly may be constructed such that the electrode taps of the cathodes and the electrode taps of the anodes are connected to additional leads, and the leads protrude outward from the battery.

The battery cells are connected in series and/or parallel with each other in one battery module, or the battery cells of one battery module are connected in series and/or parallel with the battery cells of another battery module. In a preferred embodiment, a plurality of battery modules are manufactured by coupling electrode terminals of the battery cells to each other, while arranging the battery cells in series in the longitudinal direction, such that the electrode terminals of the battery cells are successively adjacent to each other, bending the battery cells by twos or more such that the battery cells are stacked while being in tight contact with each other, and surrounding the stacked battery cells by predetermined numbers with the cell covers.

The coupling between the electrode terminals is accomplished in various manners, such as welding, soldering, and mechanical coupling. Preferably, the coupling between the electrode terminals is accomplished by welding.

The side sealing parts among the edge sealing parts of the battery cell are bent such that the side sealing parts approximately coincide with the inner shape of the case. As a result, the spatial utilization is improved, and therefore, it is possible to manufacture a battery module having a compact structure.

Since heat is generated from a secondary battery during the charge and discharge of the secondary battery, the effective dissipation of the generated heat to the outside is critical to extend the life of the battery. Consequently, the cell covers may be made of a metal sheet having high thermal conductivity such that heat generated from the unit cells in the cell covers is easily discharged to the outside.

In a preferred embodiment, each cell cover is provided at the outer surface thereof with a plurality of linear protrusions which are spaced apart from each other in the lateral direction (the width direction). Preferably, at least one of the linear protrusions has a depression in which a thermistor is mounted. Especially, the depression may be formed in the middle region of the linear protrusion located at the middle region of each cell cover for very sensitively measuring the temperature of the corresponding battery cell.

Also, the upper-end and lower-end protrusions among the linear protrusions may have projection parts preferably formed in opposite shapes. The projection parts are formed in a shape corresponding to those of neighboring battery modules when battery modules are stacked, thereby preventing the battery modules from being reversely stacked or deviated from each other.

Preferably, the protrusions having the projection parts are arranged in a noncontinuous structure about the projection parts. In this case, a coolant (for example, air) flows in the longitudinal direction as well as in the lateral direction of the cell covers while the battery modules are stacked, whereby the cooling efficiency is further improved.

According to circumstances, most of the protrusions may be constructed such that the length between opposite ends of the protrusions is less than the width of the cell covers. In this case, the flow of the coolant in the longitudinal direction of the cell covers is further accelerated.

The cell covers may be provided at the side edges thereof with steps of a predetermined size for easily fixing the battery module when the cell covers are coupled with a frame member. Preferably, the cell covers are provided at the outer surfaces adjacent to the upper and lower ends thereof with steps of a predetermined size for easily fixing the battery module. According to circumstances, the cell covers may be provided at the outer surfaces adjacent to the opposite sides thereof with steps of a predetermined size for easily fixing the battery module. More preferably, the steps are formed at the outer surfaces adjacent to the upper and lower ends and the opposite sides of the cell covers for more securely fixing the battery module.

In accordance with another aspect of the present invention, there is provided a middle- or large-sized battery pack manufactured using the battery module as a unit body.

The middle- or large-sized battery pack is manufactured by electrically and mechanically connecting a plurality of secondary batteries to supply high-output, large-capacity electric energy. For example, the middle- or large-sized battery pack may be manufactured by mounting a stack of two or more battery modules to a pack frame such that the stack is erected in the lateral direction.

In a preferred embodiment, the pack frame includes a lower frame to which the battery module stack is mounted while being erected in the lateral direction and an upper frame coupled with the lower frame.

Preferably, the upper and lower frame members are constructed in a structure to surround the edges of the battery modules and expose the outer surfaces of the battery modules to the outside so as to accomplish easy heat dissipation of the battery modules when the upper and lower frame members are coupled with each other after the battery modules are mounted in the upper and lower frame members. Specifically, the upper and lower frame members are open in the lateral direction such that the edges of the battery modules are fixed to the upper and lower frame members.

In a preferred embodiment, the upper and lower frame members are provided at the insides thereof with pluralities of partitions for guiding the vertical mounting operation of the respective unit modules. The partitions may include grooves formed in the inside of the upper and lower frame members such that the edges of the unit modules are inserted into the grooves and/or partition walls for assisting the edges of the unit modules to be stably mounted in the grooves.

The upper and lower frame members are coupled with each other by mounting the unit modules to one of the upper and lower frame members (for example, the lower frame member) and coupling the other frame member (for example, the upper frame member) to the frame member in which the unit modules are mounted. The coupling between the upper and lower frame members may be accomplished in various manners. For example, a hook may be formed at one of the frame members, and a coupling hole corresponding to the hook may be formed in the other frame member, whereby the coupling between the upper and lower frame members is accomplished without using an additional coupling member.

In a battery pack including a plurality of battery cells, it is necessary to measure and control the voltage and temperature of the battery cells in consideration of the safety and operational efficiency of the battery module. For this reason, the attachment of a sensing member for measuring the voltage or temperature of the battery cells is one of the principal factors further complicating the construction of the battery pack.

The above-mentioned problem may be solved by the provision of a sensing unit mounted along one of the frame members for sensing the voltage and/or temperature of the battery cells in accordance with the present invention.

The electrode terminals of the outermost battery modules among the battery modules mounted in the upper and lower frame members are electrically connected to external circuits or electrode terminals of neighboring battery modules. To this end, input and output terminal bus bars are connected to the electrode terminals of the outermost battery modules. In a preferred embodiment, the bus bars are provided with coupling holes, and at least one of the frame members is provided at the outside thereof with coupling protrusions corresponding to the coupling holes, whereby the bus bars are easily and stably mounted to the electrode terminals.

The middle- or large-sized battery pack according to the present invention further comprises a device (a so called battery management system) for controlling the operation of the battery module. Preferably, the battery management system (BMS) is mounted at the opposite side (the rear of the battery module) to the side where the input and output terminal bus bars are located. When a plurality of battery packs are used to construct a middle- or large-sized battery system, as will be described below, BMSs mounted to the respective battery packs may be said to be 'slave BMSs.'

The middle- or large-sized battery pack according to the present invention is constructed in a compact structure, and the mechanical coupling and electrical connection of the middle- or large-sized battery pack are stably accomplished without using a plurality of members. Also, it is possible to construct a battery pack using a predetermined number of battery cells, for example, four, six, eight, or ten battery cells, thereby effectively mounting a necessary number of battery packs in a limited space.

In accordance with a further aspect of the present invention, there is provided a middle- or large-sized battery system having high output and large capacity, the battery system being constructed by connecting a plurality of battery packs.

The middle- or large-sized battery system according to the present invention may be manufactured by combining battery packs based on desired output and capacity. The battery system according to the present invention is preferably used in electric vehicles, hybrid electric vehicles, electric motorcycles, or electric bicycles that have a limit installation space and are exposed to frequent vibration and strong impact in consideration of the installation efficiency and structural stability of the battery system.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 9:
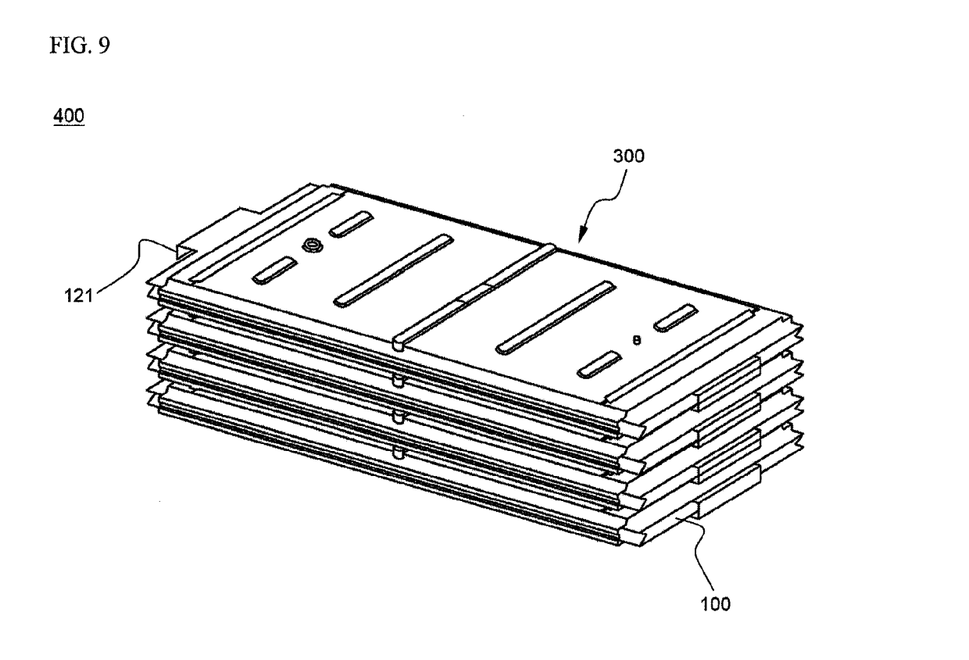
Figure 10:
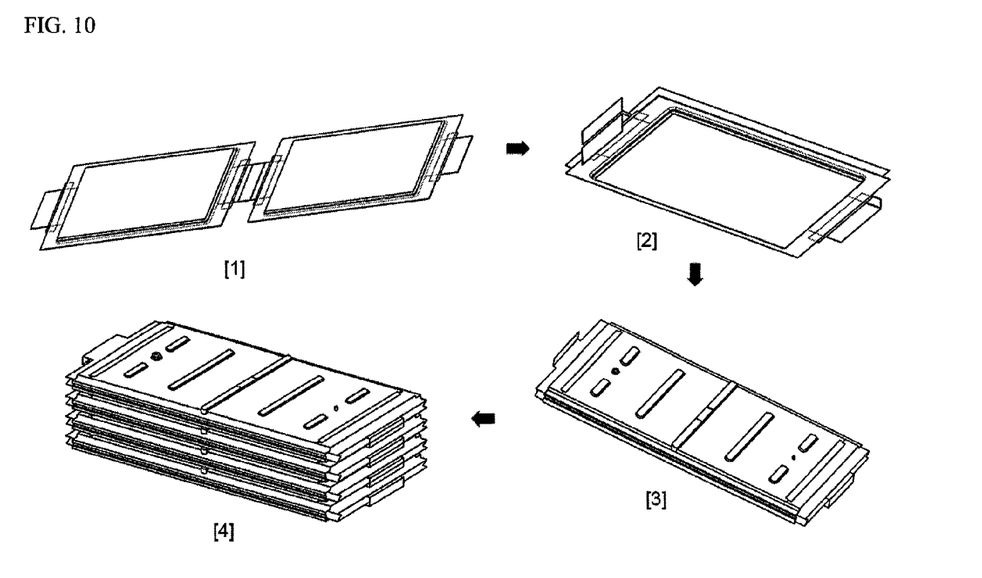
Figure 11:
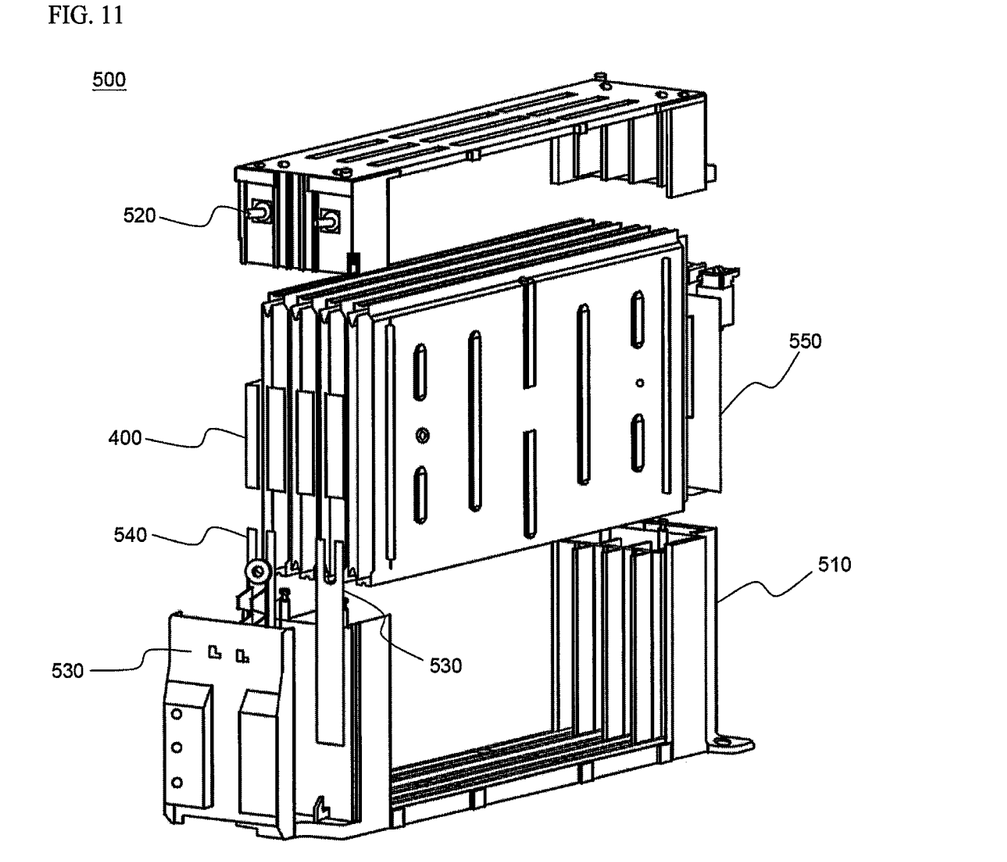
FIG. 11 is an exploded perspective view illustrating a middle- or large-sized battery pack according to a preferred embodiment of the present invention.
Figure 12:
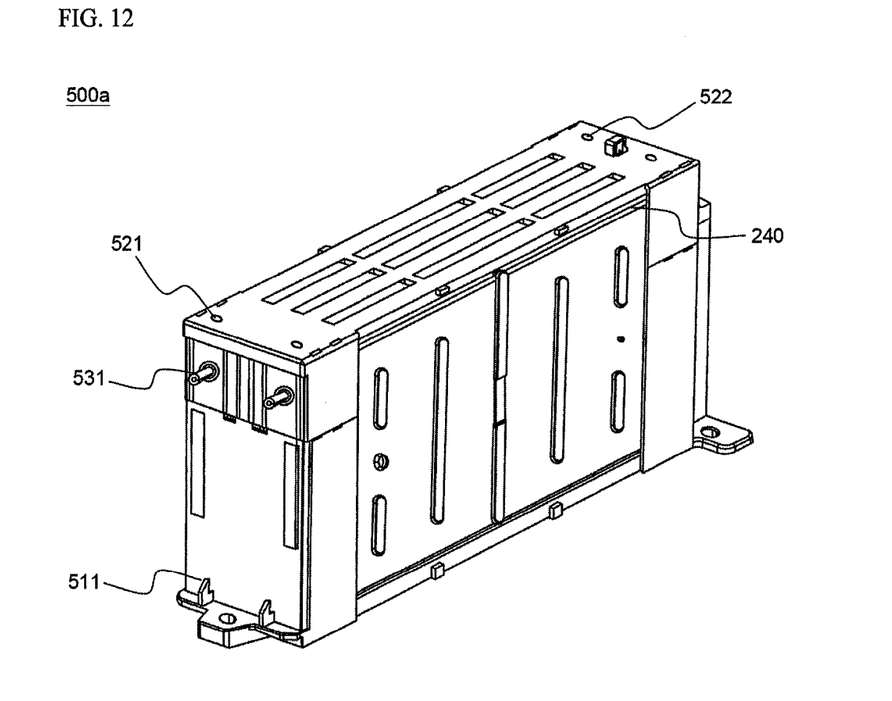
FIGS. 12 and 13 are perspective views illustrating a middle- or large-sized battery pack manufactured by stacking a plurality of battery modules.
Figure 13:
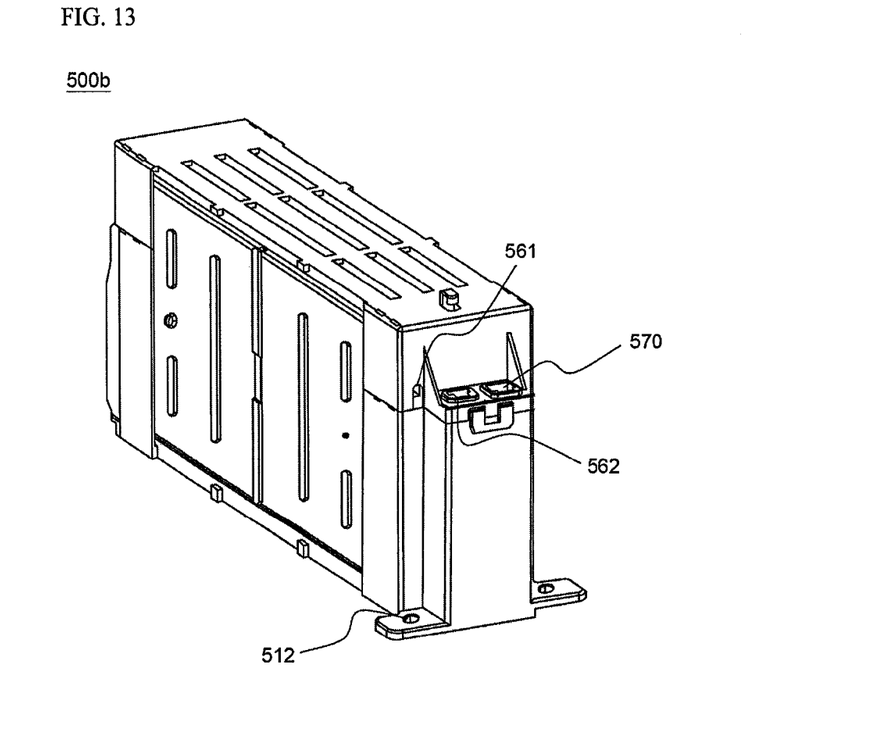

FIGS. 2 to 10 are views typically illustrating a process for assembling a battery module according to a preferred embodiment of the present invention, and FIGS. 11 to 13 are perspective views illustrating a process for assembling a middle- or large-sized battery pack using the battery module.

Figure 2:
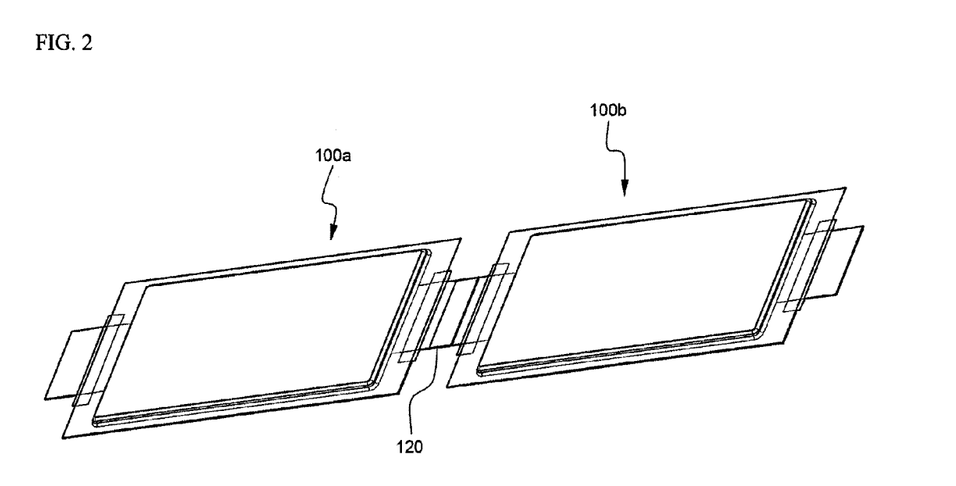
FIGS. 2 to 10 are typical views illustrating a process for assembling a battery module according to a preferred embodiment of the present invention.
Figure 3:
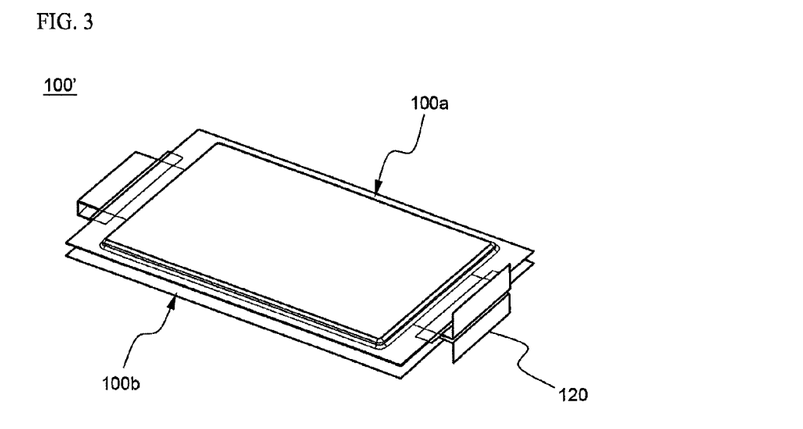

Referring first to FIG. 2, two pouch-shaped battery cells 100a and 100b are arranged in series in the longitudinal direction such that electrode terminals 120 of the battery cells 100a and 100b are successively adjacent to each other, the electrode terminals 120 of the battery cells 100a and 100b are coupled with each other by welding, and the battery cells 100a and 110b are folded such that the battery cells 100a and 110b overlap with each other. It can be seen from FIG. 3 that the welded electrode terminals 120 of the overlapped battery cells 100a and 100b are bent in the shape of a '[' to construct a battery cell stack 100' including the overlapped battery cells 100a and 110b.

Figure 4:
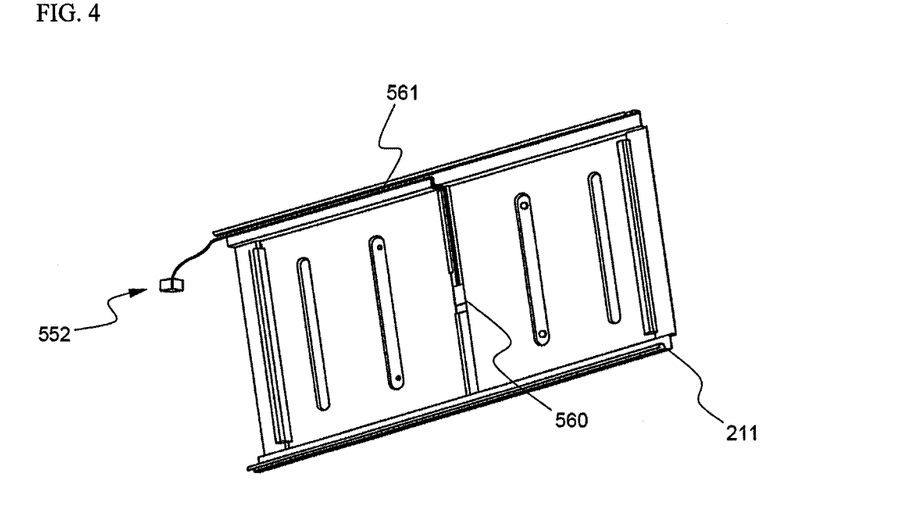
Figure 5:
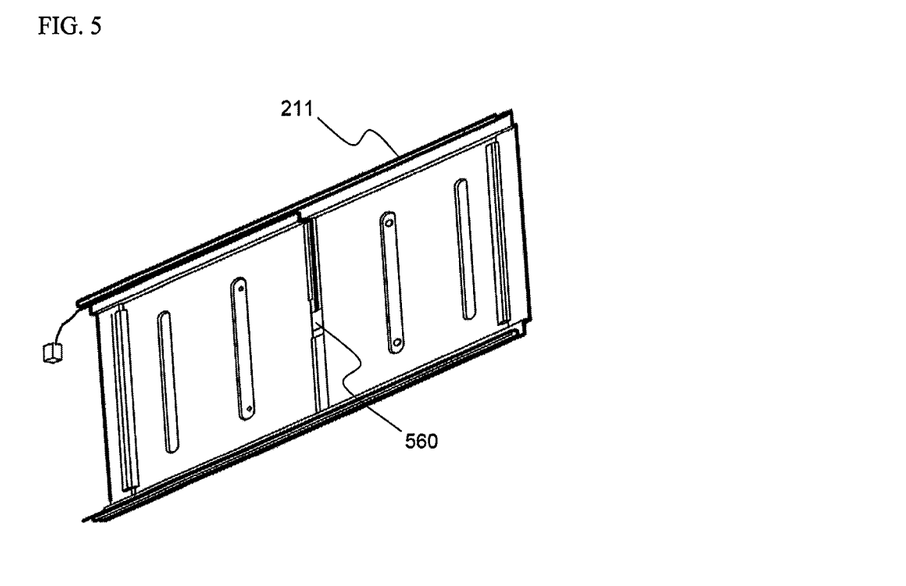

FIGS. 4 and 5 are perspective views illustrating a cell cover 200, specifically a left cover part 211 of the cell cover 200. The left cover part 211 has an inside structure corresponding to the outer shape of the battery cell stack 100' (see FIG. 3). To the middle region of the left cover part 211 is attached a thermistor 560 for sensing the temperature of the battery cells 100. The thermistor 560 is connected to an external battery management system (BMS) 562 via a cable 561. The thermistor 560 is mounted to the left cover part 211 in a structure in which the thermistor 560 is attached to the outside or inside of the left cover part 211.

Preferably, the attachment of the thermistor is performed after the assembly of the battery module. According to circumstances, however, the attachment of the thermistor is performed during the assembly of the battery module. A right cover part (not shown), which is coupled with the left cover part 211, may be constructed in the same shape as the left cover part 211.

Figure 6:
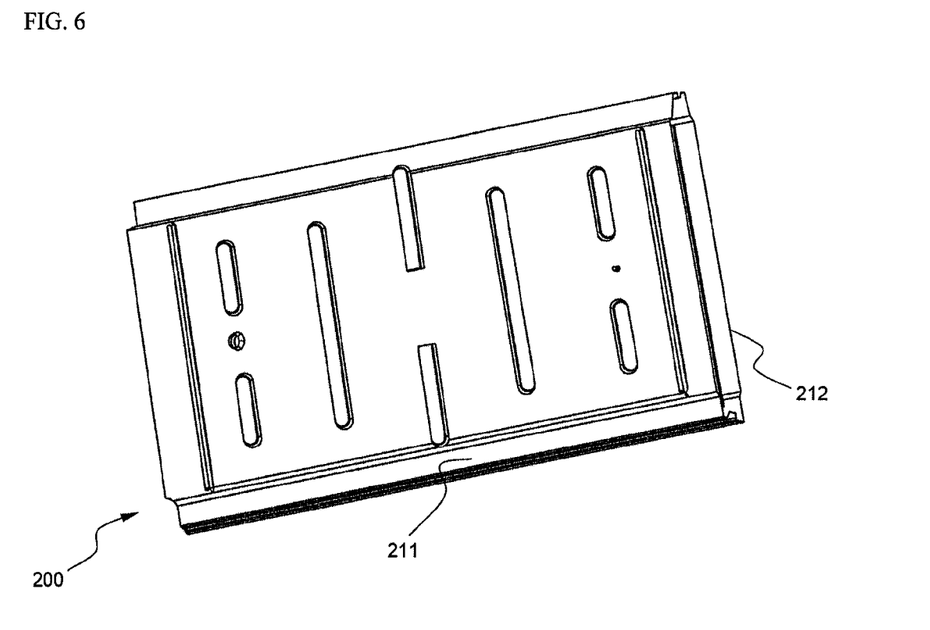

FIG. 6 is a view illustrating a high-strength cell cover 200 constructed in a structure to surround the entire outer surface of the battery cell stack 100'. The high-strength cell cover 200 restrains the repetitive expansion and contraction change of the battery cells during the charge and discharge of the battery cells while protecting the battery cells having low mechanical strength, thereby preventing separation between sealing regions of the battery cells. The cell cover 200 includes a pair of left cover part 211 and a right cover part 212. The left cover part 211 and the right cover part 212 may be coupled with each other without using an additional coupling member. The thermistor 560 (see FIG. 4) is attached to the middle region of each cover part constituting the cell cover 200. The thermistor 560 is connected to an external connector (not shown) via a cable.

Figure 7:
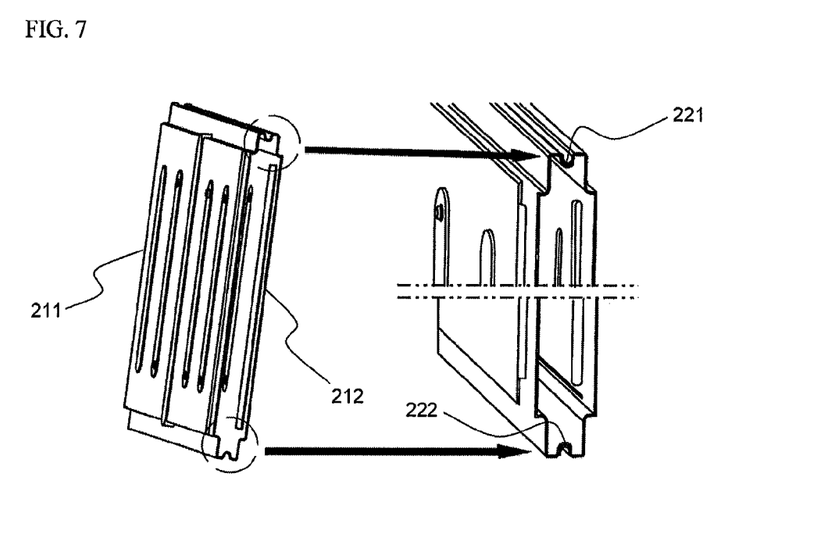

The coupling structure of the cell cover 200 is illustrated in detail in FIG. 7. FIG. 7 illustrates a sectional view and a partially enlarged view of the cell cover 200. Referring to FIG. 7, the cell cover parts 211 and 212 have coupling parts constructed in symmetrically bent structures 221 and 222 formed approximately symmetrically in vertical section thereof such that the cell cover parts 211 and 212 can be engaged with each other by elastic coupling when the cell cover parts 211 and 212 are pressed while the cell cover parts 211 and 212 are in contact with each other such that the cell cover parts 211 and 212 face each other. Consequently, it is possible to accomplish strong mechanical coupling between the cell cover parts 211 and 212 without using an additional coupling member. This simple coupling fashion is more suitably used for mass production.

Figure 8:
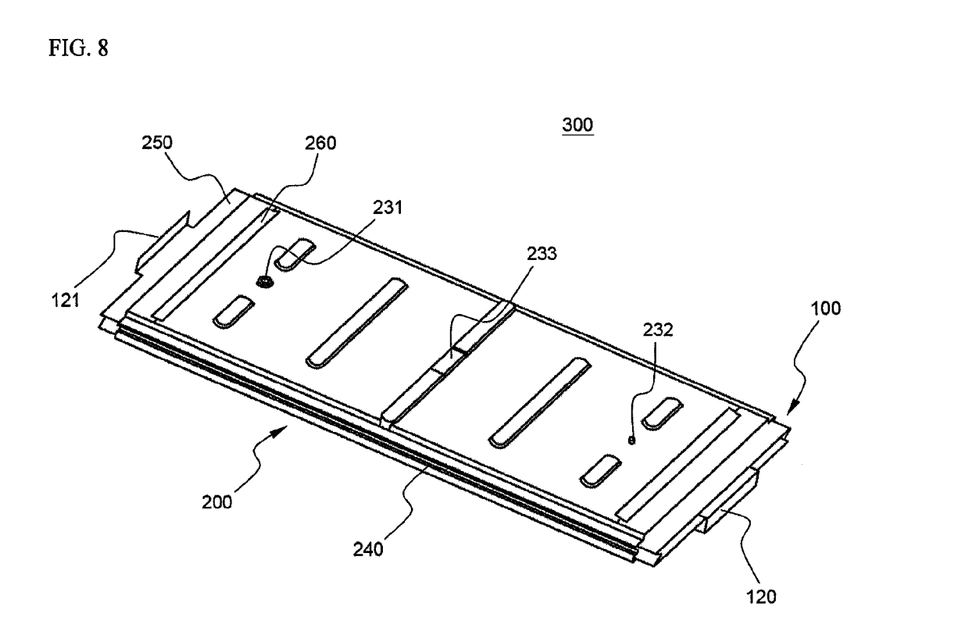

FIG. 8 is a perspective view illustrating a unit battery module according to the present invention. The cell cover 200 is mounted on the outer surface of the battery cell stack 100 for reinforcing the weak mechanical characteristics of the overlapped battery cells 100. One-side electrode terminals of the battery cells are coupled with each other by welding such that the one-side electrode terminals 120 of the battery cells 100 are bent in the shape of a '[,' and the other-side electrode terminals 121 of the battery cells 100 are bent outward such that the other-side electrode terminals 121 of the battery cells 100 are coupled to electrode terminals of neighboring unit battery modules.

The cell cover 200 is made of a pair of high-strength metal sheets coupled with each other to surround the entire outer surface of the battery cell stack excluding the electrode terminals regions of the battery cells.

At the opposite sides of the cell cover 200 are formed steps 240, by which the battery module is easily fixed. At the upper and lower ends of the cell cover 200 are also formed steps 250 having the same function as the steps 240. In addition, longitudinal fixing parts 260 are formed at the upper and lower ends of the cell cover 200 such that the battery module is easily fixed by the longitudinal fixing parts 260. The cell cover 200 is provided at the outer surface thereof with a plurality of linear protrusions which are spaced apart from each other in the lateral direction. The protrusion formed at the middle region of the cell cover has a depression 233, in which a thermistor (not shown) is mounted. Among the linear protrusions, the upper-end and lower-end protrusions have projection parts 231 and 232 formed in opposite shapes.

FIG. 9 is a perspective view illustrating a middle- or large-sized battery module 400 including a plurality of unit battery modules 300 which are stacked. According to the present invention, four unit battery modules 300 constitutes one middle- or large-sized battery module 400. Consequently, a total of eight battery cells are included in the middle- or large-sized battery module 400. Upper-end electrode terminals 121 of the outermost unit battery modules 300 are bent inward in the sectional shape of a ']' such that the electrode terminals 121 protrude slightly more than the remaining electrode terminals.

FIG. 10 typically illustrates a process for assembling a middle- or large-sized battery module according to the present invention. First, two pouch-shaped battery cells are arranged in series in the longitudinal direction such that electrode terminals of the battery cells are successively adjacent to each other, and the electrode terminals of the battery cells are coupled with each other by welding [1]. The battery cells, the electrode terminals of which are coupled with each other, are folded, such that the battery cells overlap with each other, to construct a battery cell stack. At this time, the welded electrode terminals of the overlapped battery cells are bent in the shape of a '[' [2]. Subsequently, a cell cover made of two left and right metal sheets is mounted to the battery cell stack to manufacture a unit battery module [3]. A plurality of unit battery modules manufactured as described above are stacked and electrode terminals of the unit battery modules are connected with each other to manufacture a middle- or large-sized battery module [4].

FIG. 11 is an exploded perspective view typically illustrating a process for mounting the middle- or large-sized battery module to a battery pack frame. A middle- or large-sized battery pack 500 includes a plurality of unit battery modules 400 which are stacked while the unit battery modules 400 are in tight contact with each other. Bus bars 540 are located at the front part of the battery pack 500, and a BMS 550 are located at the rear part of the battery pack 500. The bus bars 540 may be electrically connected via connecting members (not shown), such as wires, metal plates, printed circuit boards (PCBs), or flexible PCBs. At the outside of the bus bars 540 are mounted a front cover 530 for attachment and protection of the connecting members.

FIG. 12 is a right-side perspective view of the assembled battery pack 500, and FIG. 13 is a left-side perspective view of the assembled battery pack 500.

Referring first to FIG. 12, an assembled battery pack 500a is shown in a one-side perspective view. In the top of an upper frame 520 of the battery pack 500a are formed concavo-convex parts 521 for fixing the position of the battery pack 500a, such that the battery pack 500a is installed in position, and insertion parts 522 in which fixing screws are inserted. It is required that electrode terminals of the outermost unit modules among the unit modules mounted to upper and lower frame members 520 and 510 be electrically connected to an external circuit or neighboring battery modules. For this reason, the external input and output terminal bus bars 540 are connected to the electrode terminals of the outermost unit modules. In order that the bus bars 540 are mounted to the respective electrode terminals, bus bars are provided with coupling holes, through which coupling protrusions 531 formed at the outside of the upper frame 520 are inserted. Consequently, the bus bars 540 are stably mounted to the respective electrode terminals when vibration or impact is applied to the battery pack.

At the lower end of the lower frame 510 are formed protrusions 511 for fixing the front cover 530 (see FIG. 11). In the front cover 530 are formed fixing holes 532 (see FIG. 11) for fixing the power cable, which was previously described. Also, the steps 240 are formed at the end of the battery module, and therefore, the battery module is fixed to the pack frame while the battery module is inserted by 3 mm in the pack frame.

Referring to FIG. 13, an assembled battery pack 500b is shown in an other-side perspective view. At one side of the battery pack 500b are mounted two connectors. One of the connectors is a thermistor connector 562 to which a cable connected to a thermistor (not shown) mounted at the inside of the cell cover and extending through a thermistor hole 561 is connected. The other connector is a cable connector 570 to which a cable for controlling the operation of the battery module is connected. The cable connector 570 is located adjacent to the thermistor connector 562. The lower frame 510 is provided at opposite sides of the lower end thereof with coupling holes 512 for fixing the battery pack 500b.

A plurality of battery packs 500a may be connected with each other to manufacture a middle- or large-sized battery system having higher output and larger capacity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the present invention has the effect of easily mounting a sensing unit that is capable of minimizing the weight and size of battery cells while effectively reinforcing the low mechanical strength of the battery cells and sensing the operation state of the battery cells to a battery module. In addition, the present invention has the effect of manufacturing the battery module by a simple assembly process without using a plurality of members for mechanical coupling and electrical connection, thereby decreasing the manufacturing costs of the battery module, and effectively preventing the battery module from being short-circuited or damaged during the manufacture or the operation of the battery module. Furthermore, the present invention has the effect of manufacturing a middle- or large-sized battery system having desired output and capacity using the battery module as a unit body.

What is claimed is:

1. A battery module including plate-shaped battery cells having electrode terminals formed at the upper and lower ends thereof, wherein the battery module comprises:
    two or more battery cells constructed in a stacked structure in which the battery cells are connected in series with each other such that electrode terminal connections between electrode terminals of successively adjacent battery cells are bent such that the battery cells are stacked, wherein each battery cell is constructed in a structure in which an electrode assembly is mounted in a case made of a laminate sheet including a metal layer and a resin layer, and an edge of the case is sealed; and a pair of cell covers for surrounding the outer surfaces of the battery cells excluding the electrode terminals of the battery cells when the cell covers are coupled with each other, wherein each cell cover includes elastic coupling parts that directly engage with the elastic coupling parts of the other cell cover to couple the cell covers with each other, wherein the cell covers are each entirely made of a metal sheet.

2. The battery module according to claim 1, wherein the cell covers each have an inside structure corresponding to an outer shape of the stacked structure, and the cell covers are coupled with each other in an assembly coupling fashion.

3. The battery module according to claim 2, wherein the elastic coupling parts are constructed in a symmetrically bent structure formed approximately symmetrically in vertical section thereof such that the cell covers are coupled with each other by elastic coupling when the cell covers are pressed while the cell covers are in contact with each other such that the cell covers face each other.

4. The battery module according to claim 1, wherein the electrode terminals are coupled with each other by welding.

5. The battery module according to claim 1, wherein the case is a pouch-shaped case made of an aluminum laminate sheet.

6. The battery module according to claim 1, wherein side sealing parts among edge sealing parts of the battery cell are bent such that the side sealing parts approximately coincide with an inner shape of the case.

7. The battery module according to claim 1, wherein each cell cover is provided at an outer surface thereof with a plurality of linear protrusions which are spaced apart from each other in a lateral direction.

8. The battery module according to claim 7, wherein at least one of the linear protrusions has a depression in which a thermistor is mounted.

9. The battery module according to claim 7, wherein upper-end and lower-end protrusions among the linear protrusions have projection parts formed in opposite shapes.

10. The battery module according to claim 9, wherein the protrusions having the projection parts are arranged in a non-continuous structure about the projection parts.

11. The battery module according to claim 7, wherein most of the protrusions are constructed such that a length between opposite ends of the protrusions is less than a width of the cell covers.

12. The battery module according to claim 1, wherein the cell covers are provided at outer surfaces thereof adjacent to upper and lower ends thereof with steps of a predetermined size for easily fixing the battery module.

13. The battery module according to claim 1, wherein the cell covers are provided at outer surfaces thereof adjacent to opposite sides thereof with steps of a predetermined size for easily fixing the battery module.

14. A middle- or large-sized battery pack comprising the battery module according to claim 1.

15. The battery pack according to claim 14, wherein the battery pack is manufactured by mounting a stack of two or more battery modules to a pack frame such that the stack is erected in a lateral direction.

16. An electric vehicle comprising the battery pack according to claim 14 as a power source.

17. A hybrid electric vehicle comprising the battery pack according to claim 14 as a power source.

18. The battery module according to claim 1, wherein the electrode assembly of each plate-shaped battery cell includes cathodes and anodes stacked in a first direction, and the battery cells are stacked along the first direction.

19. The battery module according to claim 1, wherein each successively adjacent electrode terminal connection along the successively adjacent battery cells connected in series is disposed at an alternating one of a first end and a second end of the stacked structure.

20. The battery module according to claim 1, wherein the cell covers are coupled with each other by elastic coupling when the cell covers are pressed together.

21. A battery module including plate-shaped battery cells having electrode terminals formed at the upper and lower ends thereof, wherein the battery module comprises:

two or more battery cells constructed in a stacked structure in which the battery cells are connected in series with each other such that electrode terminal connections between electrode terminals of successively adjacent battery cells are bent such that the battery cells are stacked, wherein each battery cell is constructed in a structure in which an electrode assembly is mounted in a case made of a laminate sheet including a metal layer and a resin layer, and an edge of the case is sealed; and a pair of cell covers for surrounding the outer surfaces of the battery cells excluding the electrode terminals of the battery cells when the cell covers are coupled with each other, wherein each cell cover includes elastic coupling parts that directly engage with the elastic coupling parts of the other cell cover to couple the cell covers with each other, wherein the cell covers are coupled with each other without using an additional coupling member, and wherein the cell covers are each entirely made of a metal sheet.

22. The battery module according to claim 21, wherein the pair of cell covers includes separate and distinct cell covers.

* * * * *